(12) United States Patent
Lavenne et al.

(10) Patent No.: US 12,431,262 B2
(45) Date of Patent: Sep. 30, 2025

(54) HYBRID DROP CABLE

(71) Applicant: Prysmian S.p.A., Milan (IT)

(72) Inventors: Alain Lavenne, Sens (FR); Marta Garcia San Emeterio, Maliaño (ES); Gonzalo Hernandez, Maliaño (ES)

(73) Assignee: Prysmian S.p.A., Milan (IT)

( * ) Notice: Subject to any disclaimer, the term of this patent is extended or adjusted under 35 U.S.C. 154(b) by 163 days.

(21) Appl. No.: 18/313,964

(22) Filed: May 8, 2023

(65) Prior Publication Data

US 2023/0360822 A1  Nov. 9, 2023

(30) Foreign Application Priority Data

May 9, 2022 (IT) .................. 102022000009440

(51) Int. Cl.
| | | |
|---|---|---|
| *H01B 11/02* | (2006.01) | |
| *G02B 6/44* | (2006.01) | |
| *H01B 7/18* | (2006.01) | |
| *H01B 7/282* | (2006.01) | |

(52) U.S. Cl.
CPC ............. *H01B 11/02* (2013.01); *G02B 6/443* (2013.01); *H01B 7/18* (2013.01); *H01B 7/282* (2013.01)

(58) Field of Classification Search
CPC .......... G02B 6/4432; G02B 6/44265; G02B 6/4401; G02B 6/4429; G02B 6/443; H01B 7/1825; H01B 9/005; H01B 11/02; H01B 7/08; H01B 7/18; H01B 7/282; H01B 7/288; H01B 11/22

USPC ....................................................... 174/99 R
See application file for complete search history.

(56) References Cited

U.S. PATENT DOCUMENTS

| | | | |
|---|---|---|---|
| 4,976,509 A | 12/1990 | Bachmann et al. | |
| 8,467,645 B2* | 6/2013 | Keller ................. | G02B 6/4494 |
| | | | 385/104 |
| 9,322,704 B1* | 4/2016 | Neveux, Jr. ............... | G01J 1/42 |
| 9,435,978 B1 | 9/2016 | Laws et al. | |
| 9,837,186 B2 | 12/2017 | Kachmar et al. | |
| 11,287,589 B2* | 3/2022 | Blazer .................... | G02B 6/566 |
| 2003/0123824 A1* | 7/2003 | Tatarka .................. | G02B 6/441 |
| | | | 385/113 |
| 2006/0039659 A1* | 2/2006 | Bocanegra ......... | G02B 6/44384 |
| | | | 385/103 |
| 2007/0110376 A1 | 5/2007 | Buthe et al. | |

FOREIGN PATENT DOCUMENTS

| | | |
|---|---|---|
| CN | 104867588 A | 8/2015 |
| CN | 207895911 U | 9/2018 |

* cited by examiner

*Primary Examiner* — Timothy J Thompson
*Assistant Examiner* — Michael F McAllister
(74) *Attorney, Agent, or Firm* — Slater Matsil, LLP

(57) ABSTRACT

A drop cable includes a transmission core, a strength member arranged alongside the transmission core and an outer sheath surrounding the transmission core and the strength member. The transmission core comprises two insulated conductors and an optical sub-core comprising six or more optical fibers, the optical sub-core and the insulated metallic conductors being stranded together and surrounded by a sleeve. Moreover, a diameter of the strength member is substantially equal to or higher than a diameter of the transmission core.

20 Claims, 3 Drawing Sheets

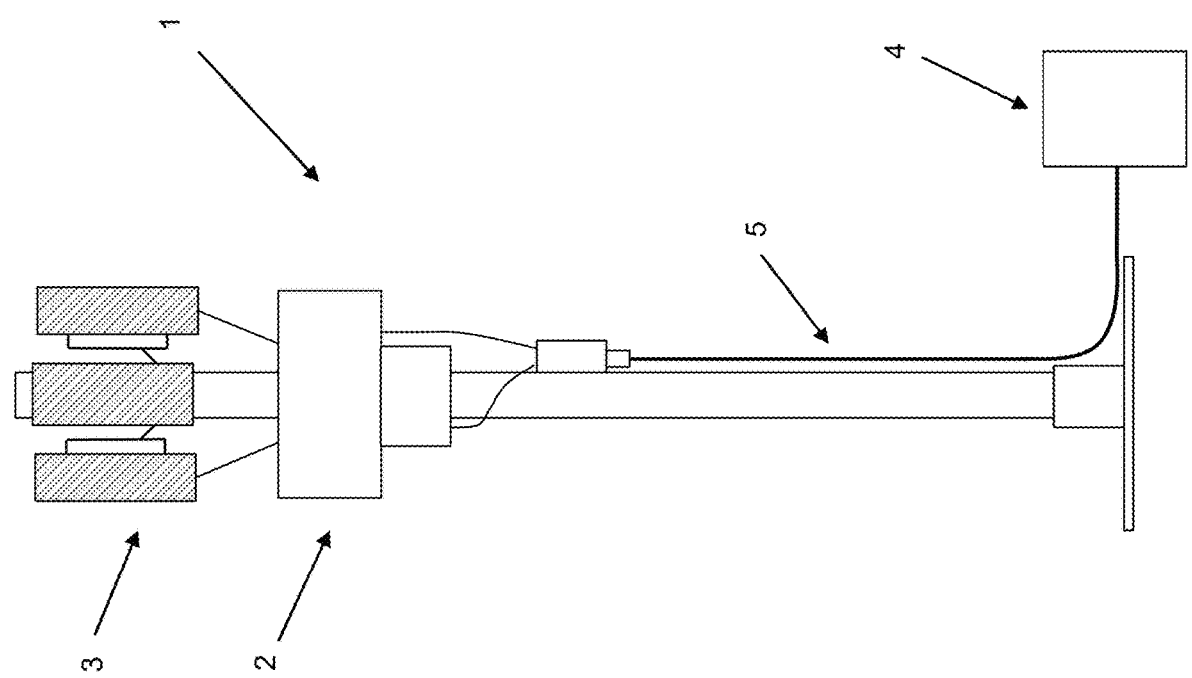

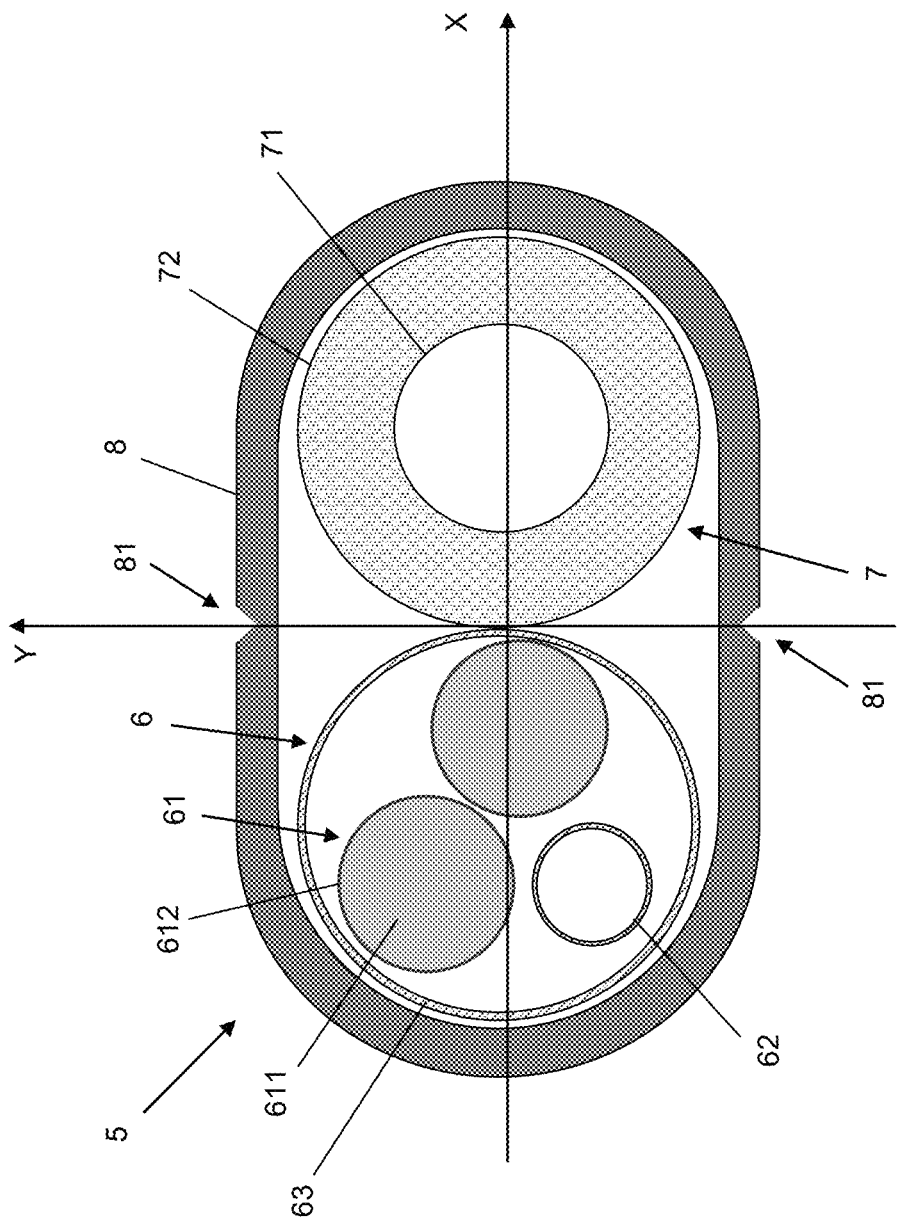

HYBRID DROP CABLE

CROSS-REFERENCE TO RELATED APPLICATIONS

This application claims priority to Italian Application No. 102022000009440 filed on May 9, 2022, which application is hereby incorporated herein by reference.

TECHNICAL FIELD

The present invention relates to the field of telecommunication cables. In particular, the present invention relates to a hybrid drop cable suitable for a radio access node, in particular, but not exclusively, for a 5G small cell deployment.

BACKGROUND

As known, a 5G network typically uses two kinds of cells, known as the small cell and the macro cell. In particular, small cells are low-powered cellular radio access nodes that have a range of 10 meters to a few kilometers. Small cells can be used to provide indoor and outdoor wireless service.

Typically, a 5G small cell comprises a radio access node comprising a radio equipment with an antenna that may be placed in a variety of indoor or outdoor locations, such as, for example, at the top of a building, on a pole, on a pylon, in a bus shelter, in an advertising panel, etc. The radio equipment (which may also be referred to as Remote Radio Unit or RRU) is connected to a base equipment, e.g., a cabinet on the street or an enclosure that may be placed in an underground vault, providing access to the optical fiber and power infrastructure.

A hybrid drop cable can be used to connect the radio equipment to the base equipment, such hybrid drop cable being capable of transmitting both the electric power and the optical signals to the radio equipment.

Examples of state-of-the-art drop cables are disclosed herein after.

U.S. Pat. No. 9,837,186 B2 discloses a hybrid cable having a jacket with a central portion positioned between left and right portions. The central portion contains at least one optical fiber and the left and right portions contain electrical conductors. The left and right portions can be manually torn from the central portion.

CN 207895911U discloses a 5G wiring is with mixed cable of photoelectricity, including the oversheath, its characterized in that the oversheath in the cladding have 2 power wires and 1 cuff to be equipped with the sleeve pipe of optic fibre, 2 power wires and the transposition of 1 cuff pipe are in the oversheath. The utility model discloses simple structure, the external diameter is little, and light in weight lays convenient to use, the copper conductor that adopts the thin copper line of the stranded transposition on tape insulation layer is the power cord, has both increased the compliance of mixed cable, has also strengthened the tensile ability of the mixed cable of photoelectricity, combine to adopt SZ hank mode to form the cable core to fill the material that blocks water in the cable core, make and mix cable stable in structure, have superior bending property and good anti side pressure and tensile strength, can adapt to abominable execution conditions and complex environment, the utility model discloses carry out the multicore fiber connector of light unit in the one end of the mixed cable of photoelectricity, be convenient for be connected with the communication interface of 5G launching tower top of the tower, can be directly plug through the connector come the loaded down with trivial details fused fiber splice of substitution.

CN 104867588 A discloses a data cable composite optical fiber hybrid cable used for a track traffic system. The data cable composite optical fiber hybrid cable comprises an outer sheath, and one set of cable unit and one set of data cable unit which are covered in the internal part of the outer sheath. The cable unit comprises a cable unit inner sheath and three cable wires from outside to inside, wherein the three cable wires are arranged in the cable unit inner sheath. The data cable unit comprises at least one data cable protecting layer and a data cable core arranged in the data cable protecting layer. The hybrid cable provided by the invention can be used for data cable communication and also for supplying power to communication equipment, the function characteristic of one-cable multi-purpose is realized, and in a wiring construction and installation process, only one hybrid cable is needed for supplying power to far-end equipment and carrying out signal communication, so that a large amount of manpower and material cost is saved, and the economic benefit is relatively high.

SUMMARY

The inventors noticed that state-of-the-art hybrid drop cables are not suitable for being deployed with different installation techniques (e.g., pulling, pushing, blowing, overhead, etc). This limits the possibility of deploying them in different environments. In the context of 5G small cells deployment, this means that the state-of-the-art hybrid drop cables may not be suitable to be used for connecting radio access nodes located in different, open or closed, environments, for instance for connecting antennas housed on top of buildings, in a bus shelter, in an advertising panel, on a pylon (for instance in a stadium), or the like.

In particular, the state-of-the art hybrid cables described above do not comprise a strength member providing the tensile strength and stiffness which are required for the installation techniques mentioned above, in particular when the cable is used in an overhead installation, in a duct or on a façade. Moreover, the separation of the optical fibers carrying the optical signals from the conductors transmitting the electric power is not easily achievable and hence the connection of the cable to the radio equipment in a 5G small cell may be difficult.

In view of the above, the Applicant has tackled, amongst other things, the issue of providing a hybrid drop cable for a radio access node, in particular, but not exclusively, for a 5G small cell deployment, which overcomes the aforesaid drawbacks. In particular, the Applicant has tackled the issue of providing a hybrid drop cable for a radio access node, in particular, but not exclusively, for a 5G small cell deployment, which allows, at the same time, to provide the strength needed during installation and operation of the cable and to simplify the connection of the cable to the radio equipment of the radio access node.

The Applicant found that some or all of above issues may be solved by embodiments of the present application that includes a drop cable comprising a transmission core, a strength member arranged alongside the transmission core, and an outer sheath surrounding the transmission core and the strength member.

The transmission core comprises two insulated metallic conductors for the transmission of the electric power and an optical sub-core for the transmission of data, the optical sub-core comprising six or more optical fibers. The optical sub-core and the insulated metallic conductors are stranded together and surrounded by a sleeve. The strength member provides the drop cable with the required tensile strength and appropriate stiffness for pushing it through a duct without buckling. Moreover, a diameter of the strength member is substantially equal to or higher than a diameter of the transmission core.

As it will be apparent, the cable of the present application is suitable for multiple uses. This means that the hybrid drop cable of the present application can be installed by any technique such as pulling, pushing or blowing, and that it can be deployed in multiple different environments, namely indoor or outdoor, in a duct, or overhead, or on a façade or on any other kind of support, such as a pylon or the like.

In the following description and in the claims, the expression "a diameter of the transmission core" or "a diameter of the strength member" and the like refers to the diameter of the cross section of the smallest circle circumscribing the considered element.

Moreover, the expression "a diameter of the strength member is substantially equal to a diameter of the transmission core" indicates that the relative difference between the diameter of the strength member and the diameter of the transmission core may vary between zero and +5%, wherein said relative difference is computed with respect to either the diameter of the transmission core or the diameter of the strength member.

In an aspect, embodiments of the present invention relate to a drop cable comprising: a transmission core; a strength member arranged alongside the transmission core; and an outer sheath surrounding the transmission core and the strength member, wherein the transmission core comprises two insulated conductors and an optical sub-core comprising six or more optical fibers, the optical sub-core and the insulated metallic conductors being stranded together and surrounded by a sleeve, and wherein a diameter of the strength member is substantially equal to or higher than a diameter of the transmission core.

Preferably, the sleeve is a water swellable sleeve.

Preferably, the sleeve is water swellable tape which is wrapped around the optical sub-core and the insulated metallic conductors.

Preferably, the optical sub-core comprises a sheath that surrounds a cavity containing the optical fibers.

According to embodiments, the optical fibers are embedded in a common buffer material substantially filling the cavity.

According to other embodiments, the optical fibers are loosely arranged in the cavity.

According to embodiments, the optical fibers are intermittently bonded with each other into one or more flexible ribbons and rolled into a compact shape.

According to embodiments, a gel or one or more water swellable yarns are present in the cavity.

According to embodiments, a strength layer surrounds the optical fibers, and the strength layer is surrounded by the sheath.

Preferably, each of the insulated conductors comprises a solid core of a metallic material and an insulating sleeve surrounding the core.

Preferably, the optical sub-core and the insulated conductors are stranded together according to an SZ stranding or a helical stranding.

Preferably, the strength member comprises a glass reinforced plastic rod surrounded by a jacket of a low smoke zero halogen material.

Preferably, the strength member has a diameter ranging between 4 mm and 6.5 mm.

Preferably, the outer sheath comprises two notches on its external surface, the notches being located at opposite symmetrical positions with respect to a longitudinal plane of the drop cable.

Preferably, the drop cable has a width ranging from 10 mm to 14 mm, and a height ranging from 6 mm and 8 mm.

BRIEF DESCRIPTION OF THE DRAWINGS

Further characteristics and advantages will become more apparent by reading the following detailed description of an embodiment given as an example with reference to the accompanying drawings, wherein:

FIG. 1 schematically shows a radio access node comprising a hybrid drop cable according to an embodiment of the present invention;

FIG. 2 is a cross-sectional view of a hybrid drop cable according to embodiments of the present invention;

DETAILED DESCRIPTION OF ILLUSTRATIVE EMBODIMENTS

Figure 3B:
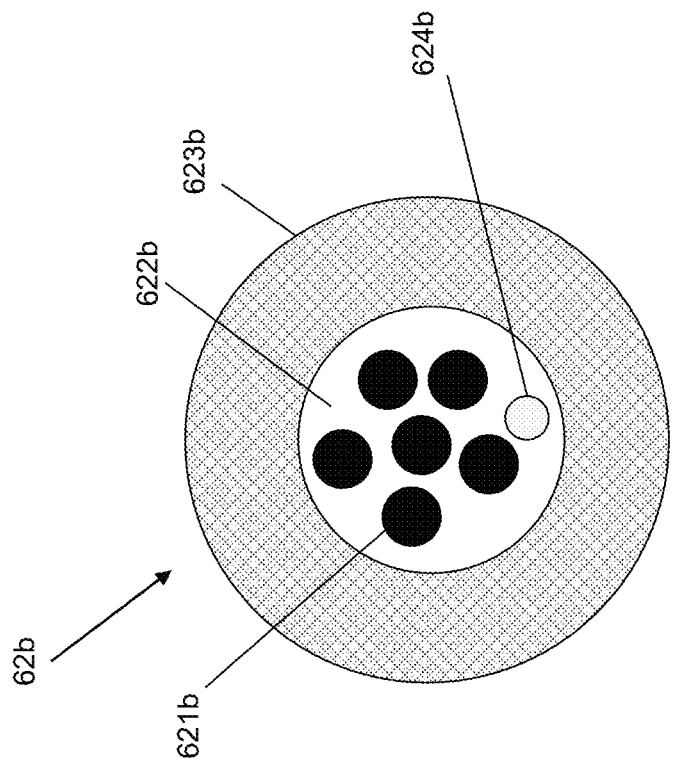
FIG. 3b is a cross-sectional view of another exemplary optical sub-core unit comprised in the hybrid drop cable of FIG. 2.

In the present description and claims, unless otherwise specified, all the numbers and values should be intended as preceded by the term "about". Also, all ranges include any combination of the maximum and minimum points disclosed and include any intermediate ranges therein, which may or may not be specifically enumerated herein.

FIG. 1 schematically shows an exemplary radio access node 1 for a 5G small cell. The radio access node 1 comprises a radio equipment 2 comprising one or more antennas 3 installed on pole, and a base equipment 4, which may comprise an enclosure installed at the base of the pole. It may be installed in a closed space such as an underground vault. The radio equipment 2 and the base equipment 4 are connected by a hybrid drop cable 5 according to embodiments of the present invention.

FIG. 2 schematically shows a cross section of a hybrid drop cable 5 according to preferred embodiments of the present invention. FIG. 2 also shows a reference coordinate system XY.

The hybrid drop cable 5 comprises a transmission core 6, a strength member 7 and an outer sheath 8 which is extruded over the transmission core 6 and the strength member 7. The hybrid drop cable 5 according to an embodiment of the the present invention has preferably a flat configuration.

The strength member 7 is arranged alongside the transmission core 6. In particular, in any plane parallel to plane XY, the centers of the transmission core 6 and the strength member 7 are arranged on a same axis, which is axis X in the hybrid drop cable of the embodiment shown in FIG. 2. In other words, the longitudinal axes of the transmission core 6 and the strength member 7 are substantially parallel and lie in the same plane or in close (along the Y axis) parallel planes. The transmission core 6 and a strength member 7 are surrounded by the outer sheath 8. The transmission core 6 comprises two insulated conductors 61 and an optical sub-core 62 containing optical fibers.

The shape of the cross section of the hybrid drop cable 5 schematically shown in FIG. 2, considered on a plane transverse to the longitudinal axis of the cable (namely, on a plane parallel to plane XY), is substantially flat, i.e., it is rectangular with rounded edges. In other words, the cross section of the hybrid drop cable 5 has an oval shape, which is elongated in the direction of the axis where the centers of the transmission core 6 and the strength member 7 are located, namely axis X. The major side of this cross section is referred to as the width of the cable and the minor side is referred to as the height of the cable. According to an exemplary embodiment, the width of the hybrid drop cable 5 is equal to 12 mm while the height of the hybrid drop cable 5 is equal to 7 mm (these dimensions relate to a cable containing two insulated conductors each with a conductor cross-sectional area of 1.3 $mm^2$). In case the conductor cross-sectional area is 0.5 $mm^2$ the dimension of the cable is 6 mm×10 mm (height×width) and if the conductor cross-sectional area is equal to 2.5 $mm^2$, the dimension of the cable is 8 mm×14 mm. In any case, the height of the hybrid drop cable is substantially twice the sum of the overall diameter of the insulated conductor (where the overall diameter of the insulated conductor is equal to the diameter of the conductor core plus twice the thickness of an insulating sleeve surrounding the conductor core) and the thickness of the outer sheath, and the width of the hybrid drop cable is substantially the sum of four times the overall diameter of the insulated conductor and twice the thickness of the outer sheath.

As already anticipated above, the transmission core 6 preferably comprises two insulated conductors 61 and an optical sub-core 62. Preferably, the optical sub-core 62 and the insulated conductors 61 are stranded together. In particular, the optical sub-core 62 and the insulated conductors 61 are stranded together according to, for instance, an SZ stranding or a helical stranding. The transmission core 6 further preferably comprises a sleeve 63 surrounding the optical sub-core 62 and the two insulated metallic conductors 61. The sleeve 63 is preferably a water swellable sleeve. In particular, it may be a water swellable tape which is wrapped (or longitudinally folded) around the insulated conductors 61 and the optical sub-core 62. The sleeve 63 may alternatively be formed by water swellable yarns. Preferably, the sleeve 63 has a thickness from 0.15 mm to 0.25 mm. A preferred value for the sleeve thickness is 0.15 mm. Advantageously, the sleeve 63 protects the optical sub-core 62 during extrusion.

The diameter or the transmission core 6 is substantially equal to twice the sum of the overall diameter of the insulated conductor and the thickness of the sleeve 63. For instance, it may have a value from 4 mm to 6 mm.

Each insulated conductor 61 preferably comprises a solid core 611 of a metallic material surrounded by an insulating sleeve 612. The material of each conductor 611 is preferably one of: copper, aluminum, copper alloy. Each insulating sleeve 612 may be made of any insulating material such as one of the following materials: PVC (polyvinylchloride), rubber, XLPE (cross-linked polyethylene), PUR (polyurethane), PTFE (polytetrafluoroethylene), ETFE (ethylene tetrafluoroethylene). Preferably, the core 611 has a diameter from 0.8 mm to 1.8 mm. A preferred value for the core diameter is 1.3 mm. Preferably, the insulating sleeve 612 has a thickness from 0.3 mm to 0.8 mm. A preferred value for the insulating sleeve thickness is 0.6 mm.

The optical sub-core 62 preferably comprises six or more optical fibers. According to preferred embodiments of the present invention, the optical sub-core 62 comprises from six to eighteen optical fibers. According to embodiments of the present invention, the optical sub-core 62 may comprise a loose tube (or, buffer tube) enclosing the optical fibers. The optical fibers may be arranged loose, in a tight fiber bundle, or intermittently connected in a flexible ribbon.

According to an embodiment of the present invention, the diameter of the optical sub-core 62 may range from 1.5 mm to 2.5 mm.

According to preferred embodiments of the present invention, the strength member 7 comprises a Glass Reinforced Plastic (GRP) rod 71. In some embodiments the GRP rod 71 is surrounded by a jacket 72 of polyamide (PA), High Density Polyethylene (HDPE), Low Density Polyethyle (LDPE), a Low Smoke Zero Halogen (LSOH) material, or other thermoplastic material. Preferably, the GRP rod 71 has a diameter from 3 mm to 5 mm. A preferred value for the GRP rod diameter is 3 mm. Preferably, the jacket 72 has a thickness from 0.2 mm to 1.5 mm. A preferred value for the jacket thickness is 1 mm. According to an embodiment of the present invention, the strength member 7 is preferably up-jacketed to at least match the diameter of the transmission core 6. In other words, the diameter of the strength member 7 is preferably substantially equal to or higher than the diameter of the transmission core 6. For instance, it may vary between 4 mm and 6.5 mm.

The strength member provides the required tensile strength and stiffness to the hybrid drop cable during installation and in operative conditions. Indeed, the strength member described above, having, inter alia, a diameter which is substantially equal to or higher than the diameter of the transmission core, allows to protect the optical sub-core when, for instance, the cable is used in an overhead installation and cable clamps are used to fix the cable. The strength member allows providing the cable with the required stiffness when it is pushed through a duct. Moreover, it allows preventing the cable contraction that may occur in case of temperature variation. Finally, in operative conditions of, e.g., an overhead installation, the strength member allows providing the required tensile strength to the cable to guarantee its integrity when loads are applied, such as those due to adverse weather conditions and protects the transmission core when the cable is crushed or impacted by external elements.

As mentioned, the outer sheath 8 surrounds both the transmission core 6 and the strength member 7. Preferably, the outer sheath 8 is made of a polymer material. More preferably the polymer material is one or a combination of: polyethylene (PE), LDPE (Low-Density Polyethylene), PP (Polypropylene), PA (Polyamide), LSOH (Low Smoke Zero Halogen) polymer. Preferably, the outer sheath 8 has a thickness from 0.8 mm to 1.5 mm. A preferred value for the outer sheath thickness is 1 mm.

Preferably, the outer sheath 8, on its external surface, comprises one or more notches 81. The outer sheath 8 of the hybrid drop cable 5 schematically shown in FIG. 2 comprises two notches 81 on its external surface, which may be located at opposite symmetrical positions with respect to the longitudinal plane of the cable. They are shown in the cross-section of the cable as located along the Y axis at symmetric positions with respect to the X axis.

Figure 3A:
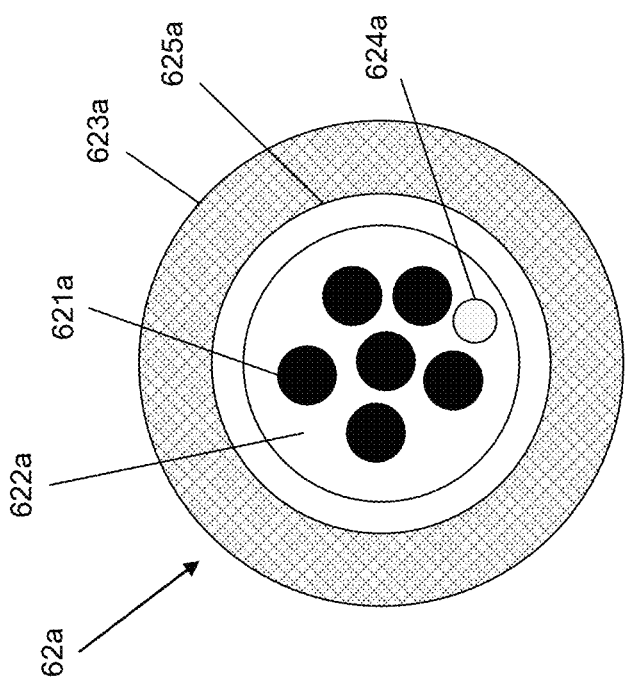
FIG. 3a is a cross-sectional view of an exemplary optical sub-core comprised in the hybrid drop cable of FIG. 2.

FIGS. 3a and 3b show cross sections of an optical sub-core 62a, 62b according to embodiments of the present invention. According to these embodiments, the optical sub-core 62a, 62b comprises a number of optical fibers 621a, 621b. The number of optical fibers 621a, 621b is at least six and preferably maximum eighteen. A sheath 623a, 623b surrounds a cavity 622a, 622b containing the optical fibers 621a, 621b. Preferably, the sheath 623a, 623b is made of a thermoplastic material with a high elastic modulus and comprises polyamide (PA), polyethylene (PE) or polypropylene (PP). In some embodiments, the optical fibers 621a, 621b are embedded in a common buffer material substantially filing the cavity. Preferably, the buffer material is made of a cured acrylate. In other embodiments, the fibers 621a, 621b are loosely arranged in the cavity 622a, 622b. Alternatively, the fibers 621a, 621b may be intermittently bonded with each other into one or more flexible ribbons and rolled into a compact shape. In embodiments in which the optical fibers 621a, 621b are loosely arranged or intermittently bonded with each other, a gel or one or more water swellable yarns 624a, 624b may be present in the cavity 622a, 622b. In the embodiment of FIG. 3a, an optional strength layer 625a surrounds the optical fibers 621a and the strength layer 625a is surrounded by the sheath 623a. Preferably the strength layer 625a is made of aramid yarns. The optical sub-core 62a, 62b may comprise a ripcord (not shown) underneath the sheath 623a, 623b for tearing the sheath and providing access to the fibers 621a, 621b. The diameter of the optical sub-core 62a with the strength layer 625a may range from 1.8 mm to 2.3 mm. The diameter of the optical sub-core 62b without the strength layer may range from 1.2 mm to 2 mm.

Advantageously, the optical sub-core 62 may be fan out from the hybrid drop cable 5 for pre-connectorisation or may be routed to optical connection points. In both cases the optical sub-core provides sufficient protection to the optical fibers in a compact size. The hybrid drop cable according to an embodiment of the present invention may reach a length of a few hundred meters and it can be pre-connectorized at one end or at both ends. In particular, for instance, the cable may be pre-connectorized at both ends with a length up to 100 m. According to another example, the cable may also be pre-connectorized at one end with a length up to 300 m. The hybrid drop cable according to an embodiment of the present invention is hence suitable for connecting the radio equipment to a base equipment of a 5G small cell over a distance up to 250-300 m.

Advantageously, in the hybrid drop cable according to an embodiment of the present invention, the insulated conductors and the optical fibers of the transmission cores are easily accessible. Indeed, to separate the transmission core from the strength member, the outer jacket may be conveniently notched as described above, and the strength member may be pulled away to expose the transmission core. The optical sub-core and the insulated conductors are then easily accessible by removing the sleeve around them.

Moreover, the hybrid drop cable according to an embodiment of the present invention, in particular its transmission core, is also easily connectable to the radio equipment. At one end, a spark gap may be used to separate the insulated conductors from the optical sub-core into different jumpers including standard connectors. This allows simplifying the connection of the hybrid drop cable to the radio equipment.

Advantageously, the hybrid drop cable according to an embodiment of the present invention is multi-use as it can be installed using different techniques such as pulling, pushing, blowing. It can be installed overhead, in a duct or attached to a façade of a building, or on any kind of support, such as a pylon. This makes the hybrid drop cable according to an embodiment of the present invention deployable in different indoor and outdoor environments such as on top of a building, in a bus shelter, in an advertising panel, on a pylon (for instance in a stadium), or the like.

What is claimed is:

1. A drop cable comprising:
    a transmission core;
    a strength member arranged alongside the transmission core; and
    an outer sheath surrounding the transmission core and the strength member,
    wherein the transmission core comprises two insulated metallic conductors and an optical sub-core comprising six or more optical fibers, the optical sub-core and the insulated metallic conductors being stranded together and surrounded by a sleeve, and
    wherein a diameter of the strength member is substantially equal to or higher than a diameter of the transmission core.
2. The drop cable according to claim 1, wherein the sleeve is a water swellable sleeve.
3. The drop cable according to claim 2, wherein the sleeve is water swellable tape which is wrapped around the optical sub-core and the insulated metallic conductors.
4. The drop cable according to claim 1, wherein the optical sub-core comprises a sheath that surrounds a cavity containing the optical fibers.
5. The drop cable according to claim 4, wherein the optical fibers are embedded in a common buffer material substantially filling the cavity.
6. The drop cable according to claim 4, wherein the optical fibers are loosely arranged in the cavity.
7. The drop cable according to claim 6, wherein a gel or one or more water swellable yarns are present in the cavity.
8. The drop cable according to claim 4, wherein the optical fibers are intermittently bonded with each other into one or more flexible ribbons and rolled into a compact shape.
9. The drop cable according to claim 4, wherein a strength layer surrounds the optical fibers, and wherein the strength layer is surrounded by the sheath.
10. The drop cable according to claim 1, wherein each of the insulated metallic conductors comprises a solid core of a metallic material and an insulating sleeve surrounding the core.
11. The drop cable according to claim 1, wherein the optical sub-core and the insulated metallic conductors are stranded together according to an SZ stranding or a helical stranding.
12. The drop cable according to claim 1, wherein the strength member comprises a glass reinforced plastic rod surrounded by a jacket of a low smoke zero halogen material.
13. The drop cable according to claim 1, wherein the strength member has a diameter ranging between 4 mm and 6.5 mm.
14. The drop cable according to claim 1, wherein the outer sheath comprises two notches on its external surface, the notches being located at opposite symmetrical positions with respect to a longitudinal plane of said drop cable.
15. The drop cable according to claim 1, wherein the drop cable has a width ranging from 10 mm to 14mm, and a height ranging from 6 mm to 8 mm.
16. A radio access node comprising:
    a radio equipment comprising one or more antennas installed on a pole; and
    a base equipment comprising an enclosure installed at a base of the pole; and
    a drop cable coupling the radio equipment and the base equipment, the drop cable comprising
        a transmission core,
        a strength member arranged alongside the transmission core, and an outer sheath surrounding the transmission core and the strength member, wherein the transmission core comprises two insulated metallic conductors and an optical sub-core comprising six or more optical fibers, the optical sub-core and the insulated metallic conductors being stranded together and surrounded by a sleeve, and wherein a diameter of the strength member is substantially equal to or higher than a diameter of the transmission core.

17. The radio access node according to claim 16, wherein the sleeve is a water swellable sleeve.

18. The radio access node according to claim 17, wherein the sleeve is water swellable tape which is wrapped around the optical sub-core and the insulated metallic conductors.

19. The radio access node according to claim 16, wherein the optical sub-core comprises a sheath that surrounds a cavity containing the optical fibers.

20. A drop cable comprising:
 a transmission core, the transmission core comprising two insulated metallic conductors and an optical sub-core comprising six or more optical fibers, the optical sub-core and the insulated metallic conductors being stranded together and surrounded by a sleeve;
 a strength member arranged alongside the transmission core; and
 an outer sheath surrounding the transmission core and the strength member, wherein a diameter of the strength member is substantially equal to or higher than a diameter of the transmission core, wherein the optical sub-core comprises a sheath that surrounds a cavity containing the optical fibers.

* * * * *